(12) United States Patent
Chen et al.

(10) Patent No.: US 7,497,589 B2
(45) Date of Patent: Mar. 3, 2009

(54) DISPLAY AND BACKLIGHT MODULE THEREOF

(75) Inventors: Hong-Ming Chen, Hsinchu (TW); Yi-Jing Wang, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 11/838,275

(22) Filed: Aug. 14, 2007

(65) Prior Publication Data
US 2008/0158909 A1 Jul. 3, 2008

(30) Foreign Application Priority Data
Dec. 27, 2006 (TW) .............................. 95149182 A

(51) Int. Cl.
*F21S 4/00* (2006.01)
(52) U.S. Cl. ..................... 362/225; 362/29; 362/260
(58) Field of Classification Search ............... 362/29, 362/30, 97, 217, 223, 224, 225, 260, 613, 362/614
See application file for complete search history.

(56) References Cited

U.S. PATENT DOCUMENTS

| | | | | |
|---|---|---|---|---|
| 4,691,268 A | * | 9/1987 | Benson | 362/260 |
| 5,079,682 A | * | 1/1992 | Roberts | 362/260 |
| 5,442,522 A | * | 8/1995 | Kalmanash | 362/613 |
| 7,380,958 B2 | * | 6/2008 | Jeong | 362/225 |
| 2003/0043594 A1 | * | 3/2003 | Chen et al. | 362/555 |

FOREIGN PATENT DOCUMENTS

JP    03250501 A  * 11/1991

\* cited by examiner

*Primary Examiner*—Y My Quach Lee
(74) *Attorney, Agent, or Firm*—Thomas, Kayden, Horstemeyer & Risley

(57) ABSTRACT

A display and a backlight module thereof. The display includes a backlight module, a panel and a front bezel. The backlight module includes a substrate, a plurality of lamps, and a plurality of lamp holders. The substrate includes a first side and a second side. The lamps are arranged from the first side to the second side in order and parallel to the first side and the second side. The lamp holders disposed on the substrate are connected to the lamps. A line formed by the linked lamps and the substrate intersect to form an included angle.

14 Claims, 6 Drawing Sheets

DISPLAY AND BACKLIGHT MODULE THEREOF

BACKGROUND OF THE INVENTION

1. Field of the Invention

The invention relates to a backlight module, and more particularly, to the arrangement of lamps in the backlight module.

2. Description of the Related Art

FIG. 1 is a schematic view of a conventional backlight module. FIG. 2 is a sectional drawing of a conventional backlight module. Referring to FIGS. 1 and 2, a conventional backlight module 10 comprises a substrate 11, a plurality of lamps 12 and a plurality of lamp holders 13. Distances between each lamp 12 and the substrate 11 are equal. In other word, each lamp 12 is parallel to the substrate 11. The lamp holders 13 are installed on the substrate 11 for holding the lamps 12. The backlight module 10 further comprises a chamber 14 for sealing the lamps 12 and the lamp holders 13.

Referring to FIG. 2, when using the backlight module 10, the backlight module 10 stands. Thus, air surrounding the lamps 12 is heated and due to the decreasing density of the backlight module that would cause the air to move upward. During steady state operation, the backlight module 10, the upper portion of the chamber 14 fills with hot air. As a result, the temperature of the chamber 14 is not uniform. The temperature of the chamber 14 affects lamp efficiency and extinction ratio of liquid crystals. Due to the temperature of the backlight module 10 is not uniform, the lamp efficiency and the extinction ratio of liquid crystals will decrease and diminish the display efficiency.

BRIEF SUMMARY OF INVENTION

The invention provides a display and a backlight module thereof. The display comprises a backlight module, a panel and a front bezel. The backlight module comprises a substrate, a plurality of lamps, and a plurality of lamp holders. The substrate comprises a first side and a second side. The lamps are arranged from the first side to the second side in order and parallel to the first side and the second sides. The lamp holders are disposed on the substrate and connected to the lamps. A line formed by linking the lamps, which form an inclined angle with the substrate.

Note that the substrate further comprises a bottom surface. The bottom surface inclines from the first side to the second side.

Note that the substrate further comprises a plurality of ribs. The heights of the ribs decrease from the first side to the second side.

The invention further provides a backlight module comprising a substrate, a plurality of lamps and a plurality of lamp holders. The substrate comprises a first side and a second side. The lamps are arranged from the first side to the second side in order and parallel to the first side and the second side. The lamp holders are disposed on the substrate and connected to the lamps. The heights between the lamps and the substrate increase from the first side to the second side.

BRIEF DESCRIPTION OF DRAWINGS

The invention can be more fully understood by reading the subsequent detailed description and examples with references made to the accompanying drawings, wherein.

DETAILED DESCRIPTION OF INVENTION

A detailed description is given in the following embodiments with reference to the accompanying drawings.

Figure 1:
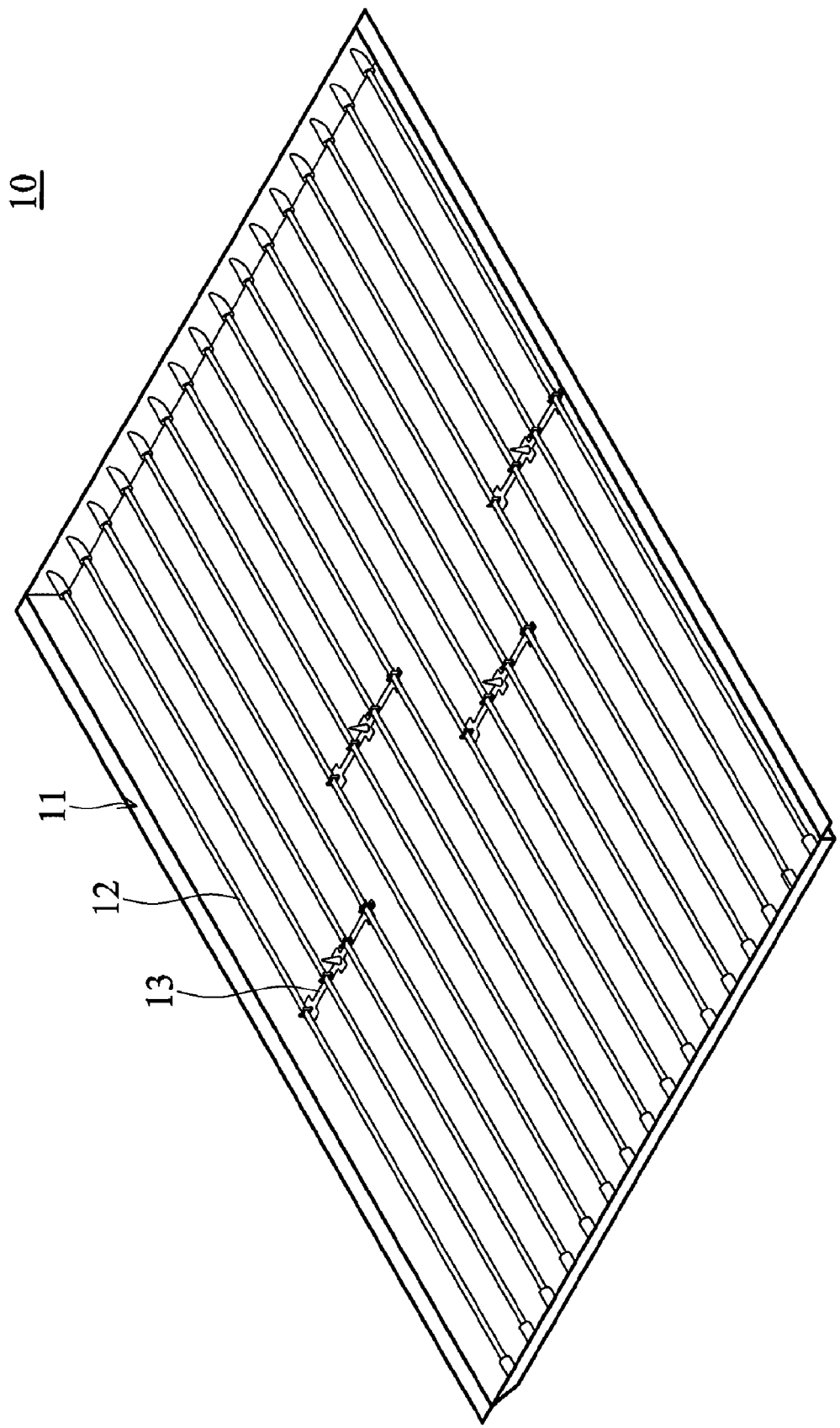
FIG. 1 is a schematic view of a conventional backlight module.
Figure 2:
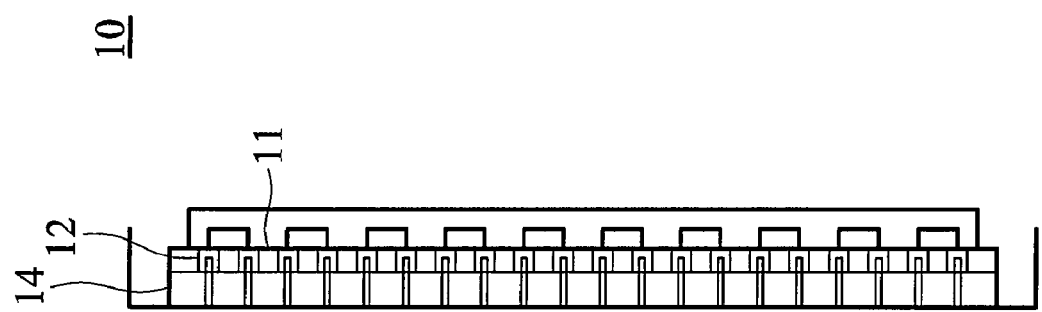
FIG. 2 is a sectional drawing of a conventional backlight module.
Figure 3A:
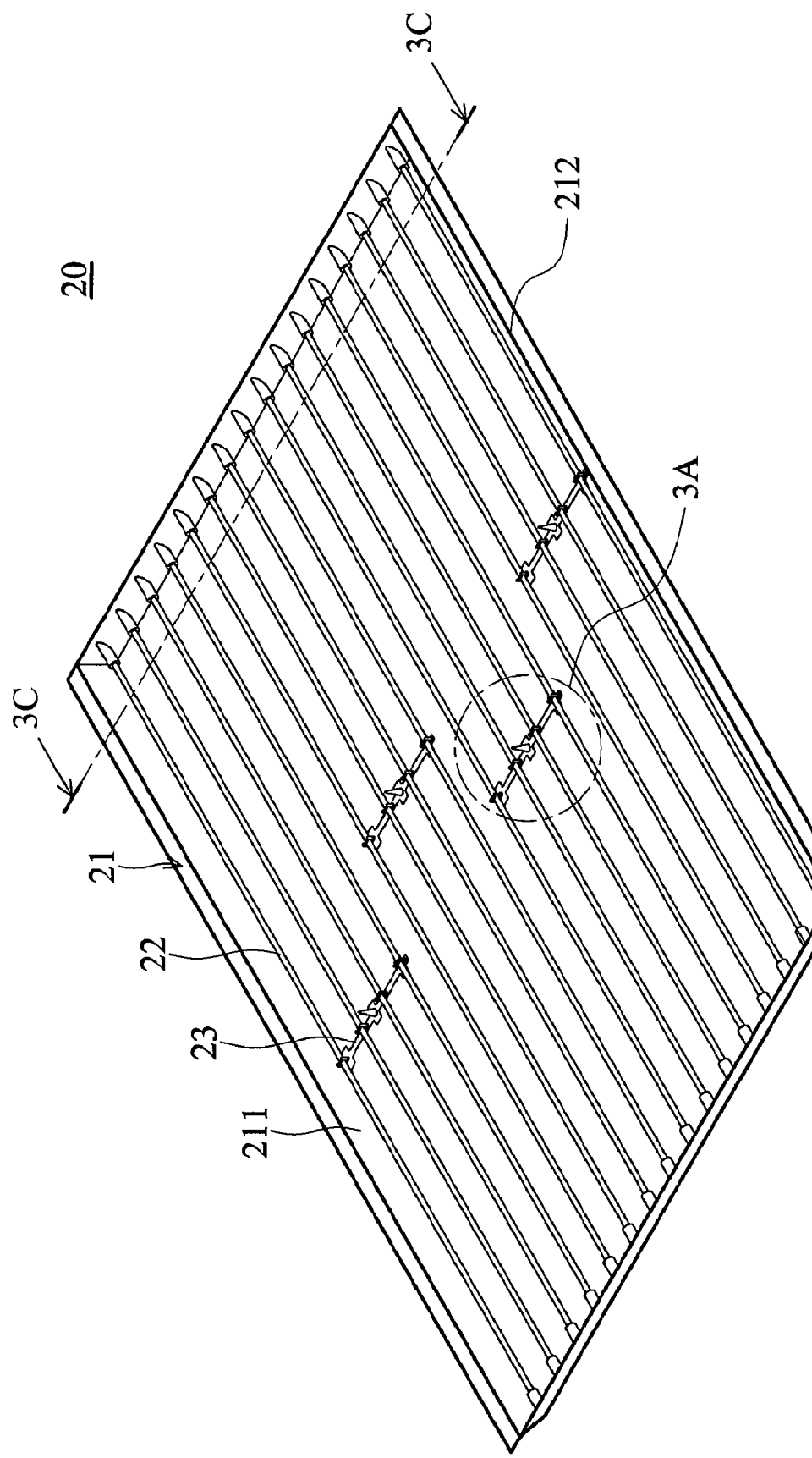
FIG. 3A is a schematic view of an embodiment of a backlight module of the invention.
Figure 3B:
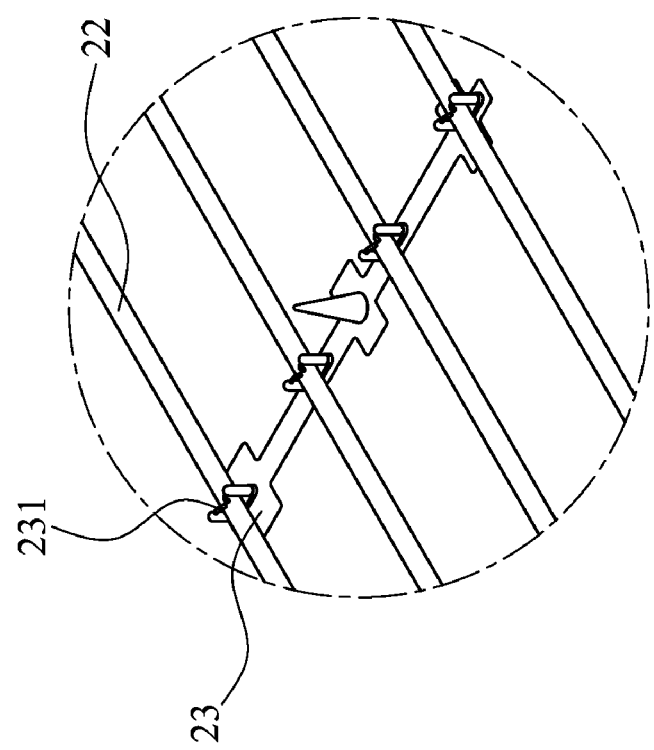
FIG. 3B is an enlarged view of FIG. 3A.
Figure 3C:
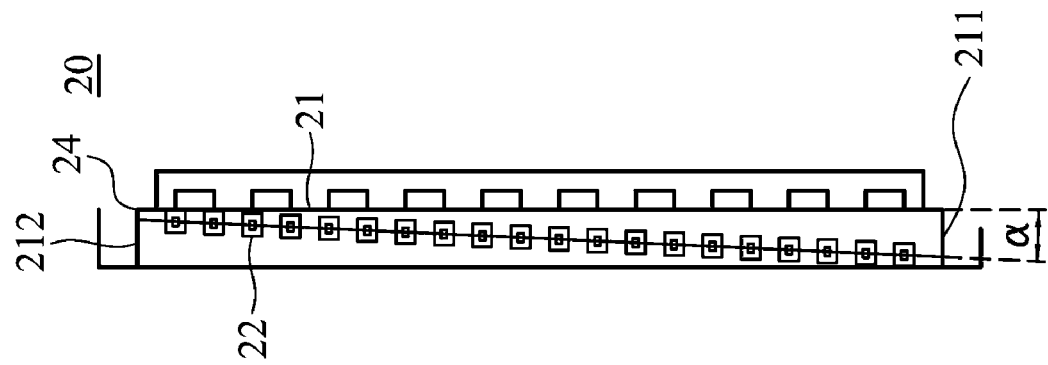
FIG. 3C is a sectional view along a sectional line 3C-3C in FIG. 3A.

FIG. 3A is a schematic view of an embodiment of a backlight module 20. FIG. 3B is an enlarged view of FIG. 3A. The backlight module 20 comprises a substrate 21, a plurality of lamps 22, a plurality of lamp holders 23 and a chamber 24. The substrate 21 comprises a first side 211 and a second side 212. The lamps 22 are arranged in parallel from the first side 211 to the second side 212. The lamp holder 23 disposed on the substrate 21 comprises two clips 231 for holding the lamps 22. The clips 231 are hook shaped, correspondingly installed, and connected to the lamp 22 for clipping the lamp 22. FIG. 3C is a sectional view along a sectional line 3C-3C in FIG. 3A. The distance between the substrate 21 and the lamps 22 increase from the first side 211 to the second side 212. Thus, heights of clips 231 correspond to the lamps 22. FIG. 3C shows that a line formed by the lamps 22 and the substrate 21 form an included angle $\alpha$. The included angle $\alpha$ ranges from 12.5 degrees to 15 degrees. In this embodiment, the included angle $\alpha$ is 15 degrees. The relationship of a thermal resistance (Rn) and a distance (Dn) between the lamps 22 and the substrate 21 is as follows: Rn=Dn/KaA, wherein Rn is the thermal resistance between the nth lamp and the substrate; Dn is a distance between the nth lamp and the substrate; Ka is a heat transfer coefficient of air; and A is a surface area of each lamp.

When the distance between the nth lamp 22 and the substrate 21 decreases, the thermal resistance Rn between the nth lamp 22 and the substrate 21 decreases. Thus, heat does not accumulate on the surface area of the lamps 22 so reduce the temperature of the lamps 22. On the other hand, if the distance between the nth lamp 22 and the substrate 21 increases, the thermal resistance Rn between the nth lamp 22 and the substrate 21 increases, so the heat of the lamps 22 will increase. The distance between the lamps 22 and the substrate 21 is adjusted in the backlight module 20 to prevent accumulation of heat on the upper portion of the lamps 22. As a result, the temperature of the backlight module 20 is uniform and display efficiency is enhanced.

Figure 4:
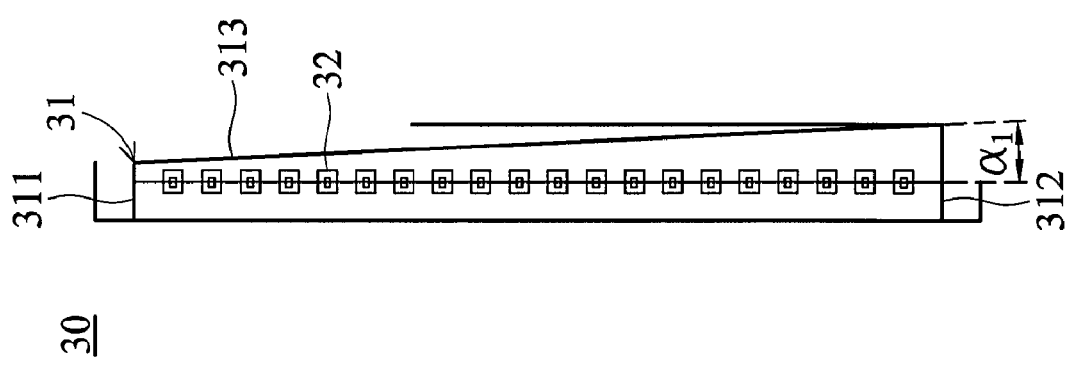
FIG. 4 is a schematic view of another embodiment of the backlight module of the invention.

FIG. 4 is a schematic view of another embodiment of the backlight module 30. The backlight module 30 comprises a substrate 31, a plurality of lamps 32 and a plurality of lamp holders (not shown). This embodiment is similar to the embodiment of FIG. 3 with the exception that the substrate 31 comprises a first side 311, a second side 312, and a bottom surface 313. The bottom surface 313 is an inclined plane and inclines from the first side 311 to the second side 312. The arrangement of the lamps 32 is horizontal and forms an included angle $\alpha_1$ with the bottom surface 313. The included angle $\alpha_1$ ranges from 12.5 degrees to 15 degrees. In this embodiment, the included angle $\alpha_1$ is 15 degrees. The relationship of a thermal resistance (Rn) and a distance (Dn)

between the lamps 32 and the substrate 31 is as follows: Rn=Dn/KaA, wherein Rn is the thermal resistance between the nth lamp and the substrate; Dn is a distance between the nth lamp and the substrate; Ka is a heat transfer coefficient of air; and A is a surface area of each lamp.

When the distance between the nth lamp 32 and the substrate 31 decreases, the thermal resistance Rn between the nth lamp 32 and the substrate 31 decreases. Thus, the heat does not accumulate on the surface area of the lamps 32, so the temperature of the lamps 32 decreases. On the other hand, if the distance between the nth lamp 32 and the substrate 31 increases, the thermal resistance Rn between the nth lamp 32 and the substrate 31 increases. Thus, the heat of the lamps 32 increases. In this embodiment, the bottom surface 312 of the substrate 31 in the backlight module 30 is inclined to prevent accumulation of heat on the upper portion of the lamps 32. Thus, the temperature of the backlight module 30 is uniform to provide the best display efficiency.

Figure 5:
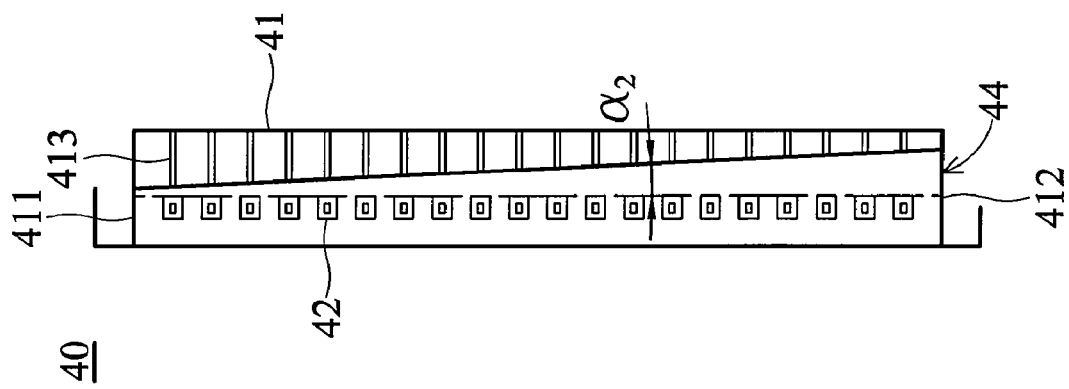
FIG. 5 is a schematic view of another embodiment of the backlight module of the invention.

FIG. 5 is a schematic view of another embodiment of the backlight module 40. The backlight module 40 comprises a substrate 41, a plurality of lamps 42 and a plurality of lamp holders (not shown). This embodiment is approximately similar to the embodiment of FIG. 3 with the exception that the substrate 41 is punched to form a plurality of ribs 413 for preventing bending of the substrate 41. The substrate 41 comprises a first side 411 and a second side 412. Note that the heights of the ribs 413 decrease from the first side 411 to the second side 412. The arrangement of the lamps 42 is horizontal and forms an included angle $\alpha_2$ with the ribs 413. The included angle $\alpha_2$ ranges from 12.5 degrees to 15 degrees. In this embodiment, the included angle $\alpha_2$ is 15 degrees. The relationship of a thermal resistance (Rn) and a distance (Dn) between the lamps 42 and the substrate 41 is as follows: Rn=Dn/KaA, wherein Rn is the thermal resistance between the nth lamp and the substrate; Dn is a distance between the nth lamp and the substrate; Ka is a heat transfer coefficient of air; and A is a surface area of each lamp.

When the distance between the nth lamp 42 and the substrate 41 decreases, the thermal resistance Rn between the nth lamp 42 and the substrate 41 decreases. Thus, the heat does not accumulate on the surface area of the lamps 42, thus the temperature of the lamps 42 decreases. Contrarily, if the distance between the nth lamp 42 and the substrate 41 increases, the thermal resistance Rn between the nth lamp 42 and the substrate 41 increases. Thus, the heat of the lamps 42 increases. In this embodiment, the heights of the ribs 413 decrease from the first side 411 to the second side 412 to change the distance between the lamps 42 and the ribs 413 of the substrate 41 to prevent accumulation of heat on the upper portion of the lamps 42. Thus, the temperature of the backlight module 40 is uniform and display efficiency is enhanced.

In the described embodiments, regardless of whether the arrangement of the lamps or the substrate is changed, the purpose is to generate an inclined angle between the line of linked lamps and the substrate for providing uniform backlight module temperature via the relationship of a thermal resistance (Rn) and a distance (Dn) between the lamps and the substrate. Thus, decreases lamp efficiency and extinction ratio of liquid crystals is prevented, further, enhancing display efficiency.

Figure 6:
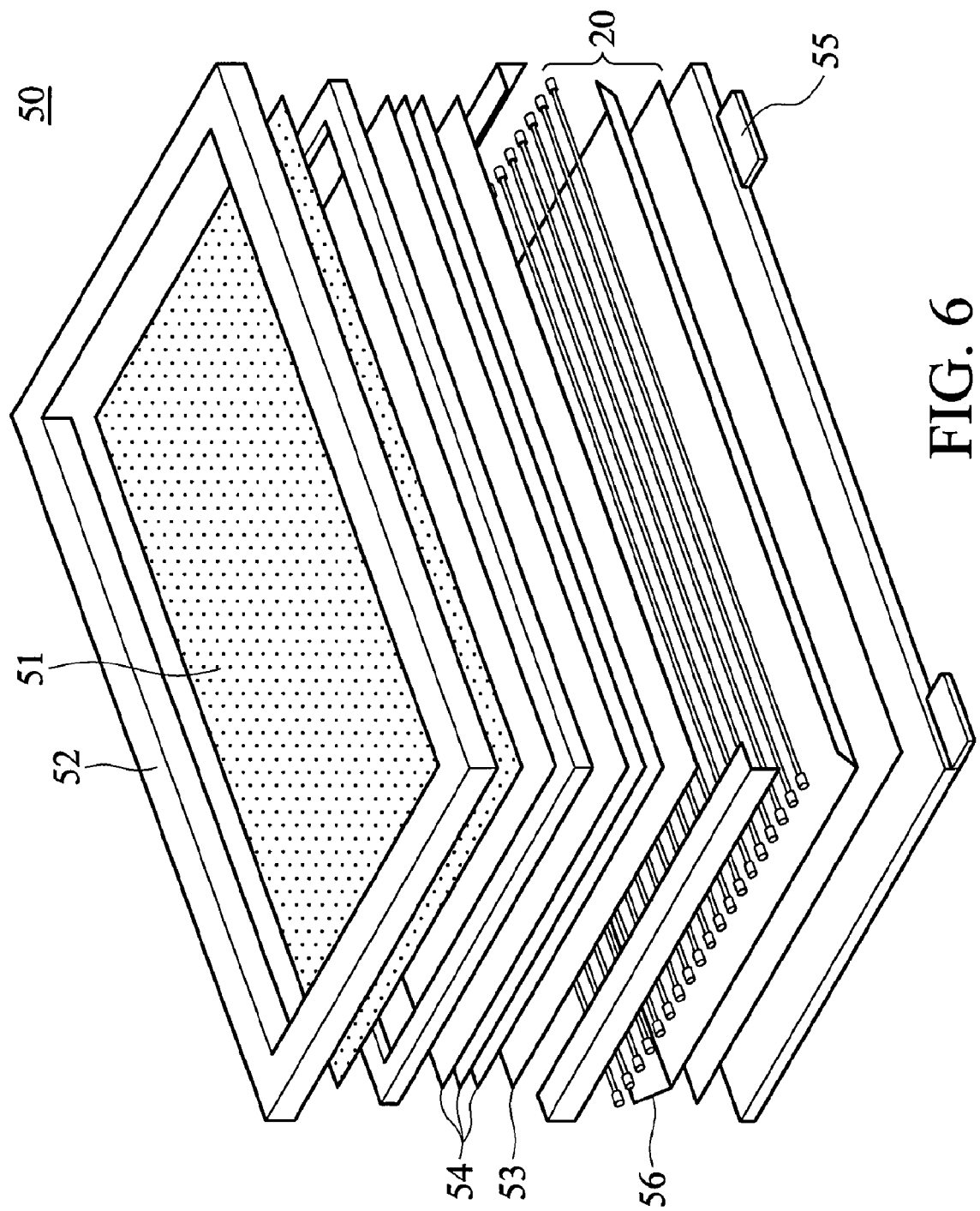
FIG. 6 is an exploded view of a display of the invention.

Referring to FIG. 6, the backlight modules 20, 30, and 40 are applied to a display 50. For example of the backlight module 20, the display 50 comprises a front bezel 52, a panel 51, an optical film 54, a diffuser 53, a backlight module 20, a back bezel 56 and a circuit board 55 arranged in order. The back bezel 56 is fixed to the front bezel 52. Note that the backlight modules 20, 30, and 40 provide more uniform temperature than the conventional backlight module, thus, backlight modules 20, 30 and 40 installed in display 50 for enhancing display efficiency.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module, comprising:
a substrate having a first side and a second side;
a plurality of lamps arranged in parallel from the first side to the second side; and
a plurality of lamp holders, disposed on the substrate, for holding the lamps;
wherein the distance between each lamp and the substrate increases from the first side to the second side;
wherein a thermal resistance (Rn) between each lamp and the substrate is equal to a distance (Dn) between the nth lamp and the substrate divided by multiplication of the heat transfer coefficient (Ka) of air and the surface area (A) of the lamp, or Rn=Dn/KaA.

2. The backlight module as claimed in claim 1, wherein each lamp holder comprises two or more clips correspondingly disposed to hold each lamp.

3. The backlight module as claimed in claim 1, wherein the lamp most close to the first side and the lamp most close to the second side form a line, the line and the substrate form an included angle, and the included angle ranges from 12.5 degrees to 15 degrees.

4. The backlight module as claimed in claim 3, wherein the included angle is about 15 degrees.

5. The backlight module as claimed in claim 1, further comprising a diffuser and an optical film, wherein the diffuser is disposed above the lamps, and the optical film is disposed above the diffuser.

6. A backlight module, comprising:
a substrate having a first side and a second side;
a plurality of lamps arranged in parallel from the first side to the second side; and
a plurality of lamp holders disposed on the substrate and connected to the lamps to hold the lamps;
wherein the lamp most close to the first side and the lamp most close to the second side form a horizontal line, and the line and the substrate form an included angle;
wherein the substrate further comprises a plurality of ribs, the heights of ribs gradually decrease from the first side to the second side.

7. The backlight module as claimed in claim 6, wherein the substrate further comprises a bottom surface, the bottom surface comprises an inclined plane, the bottom surface inclines from the first side to the second side.

8. The backlight module as claimed in claim 6, wherein the included angle ranges from 12.5 degrees to 15 degrees.

9. The backlight module as claimed in claim 8, wherein the included angle is 15 degrees.

10. A display, comprising:
a backlight module comprising:
a substrate comprising a first side and a second side;
a plurality of lamps arranged in parallel from the first side to the second side; and
a plurality of lamp holders, disposed on the substrate and hold the lamps;
a panel, disposed above the backlight module; and a front bezel, disposed above the panel to fix the panel and the backlight module;

wherein the distance between each lamp and the substrate increases from the first side to the second side;

wherein a thermal resistance (Rn) between each lamp and the substrate is equal to a distance (Dn) between the nth lamp and the substrate dividing by the multiplication of the heat transfer coefficient (Ka) of air and the surface area (A) of the lamp, or Rn=Dn/KaA.

11. The display as claimed in claim 10, wherein each lamp holder comprises at least two clippers correspondingly disposed to hold each lamp.

12. The display as claimed in claim 10, wherein a lamp most close to the first side and a lamp most close to the second side form a line, the line and the substrate form an included angle, and the included angle ranges from 12.5 degrees to 15 degrees.

13. The display as claimed in claim 12, wherein the included angle is about 15 degrees.

14. The display as claimed in claim 10, further comprising a diffuser and an optical film, the diffuser is disposed above the lamps, the optical film is disposed above the diffuser.

* * * * *